Dec. 4, 1928.
A. W. DAVIES
1,694,208
ROTARY ENGINE AND THE LIKE
Filed June 28, 1926    2 Sheets-Sheet 1
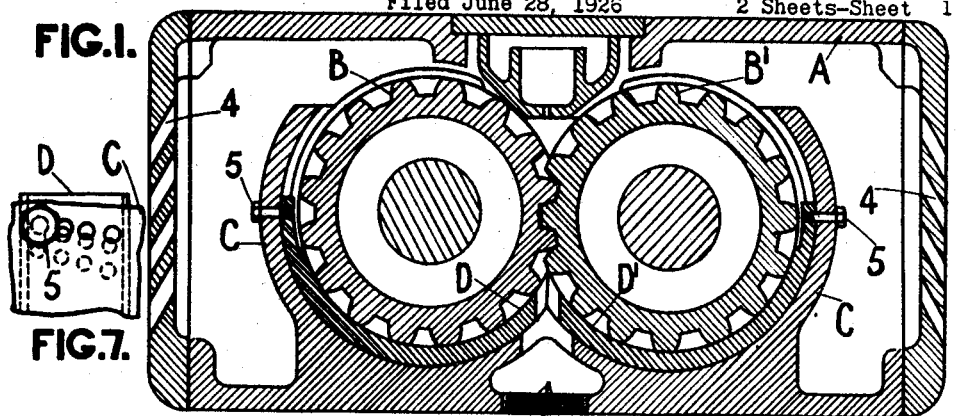
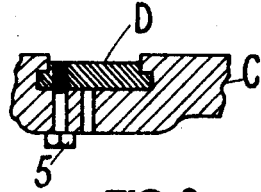
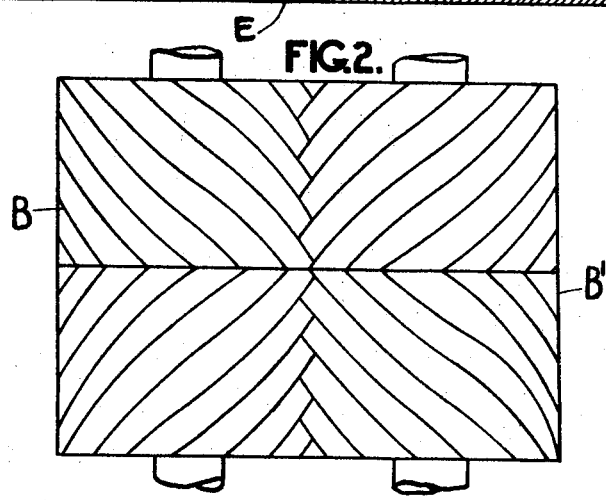
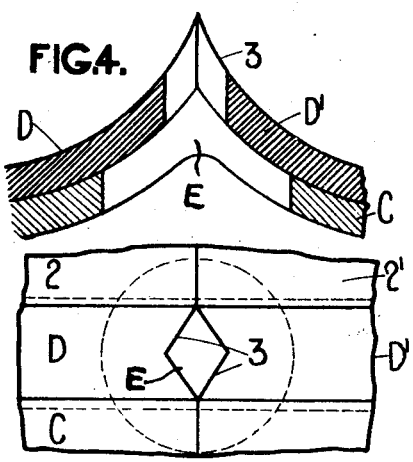
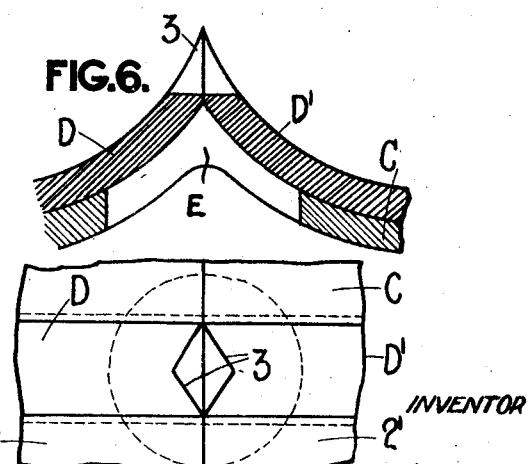
INVENTOR
Albert William Davies
O'Neill & Bunn
ATTORNEYS Dec. 4, 1928.  
A. W. DAVIES  
1,694,208

ROTARY ENGINE AND THE LIKE

Filed June 28, 1926     2 Sheets-Sheet 2

INVENTOR  
Albert William Davies  
BY O'Neill & Bunn  
ATTORNEYS

Patented Dec. 4, 1928.

1,694,208

UNITED STATES PATENT OFFICE.

ALBERT WILLIAM DAVIES, OF GLASGOW, SCOTLAND, ASSIGNOR TO MAVOR & COULSON, LIMITED, OF GLASGOW, SCOTLAND.

ROTARY ENGINE AND THE LIKE.

Application filed June 28, 1926, Serial No. 119,203, and in Great Britain September 30, 1925.

This invention refers to rotary engines and the like, hereinafter referred to generally as rotary engines, of the type comprising a casing, corresponding drums within the casings, each drum having blades which extend from end to end and thus through an intermediate region, intermediate between the ends of a drum, the blades having helical portions directed reversely from the intermediate region, the drums being correspondingly arranged with their blades intermeshing. Some examples of engines of this type are illustrated in specifications of United States Patents No. 996,169 at Figures 7 and 8 and No. 1,026,887.

In engines of this type, the fluid medium used, say, compressed air, in one arrangement is admitted to the drums by an inlet at the intermediate region, the casing having two barrier surfaces, a barrier surface for each drum and concentric therewith, the peripheral surfaces of the blades being close to the barrier surfaces so that as the drums rotate pockets are formed successively at the inlet into which pockets air is admitted successively, the cut off occurring as the trailing blade of a pocket passes beyond the inlet. This manner of admission will be termed peripheral admission, in that admission is made at an inlet where the blades of the drums present surfaces which peripherally are of cylindrical character, the radius of which may be constant from end to end of a drum. With peripheral admission a drum is used having blades extending through the intermediate region with admission at an inlet in the intermediate region.

For examples of peripheral admission, see specifications of United States Patent No. 1,026,887 and Figures 7 and 8 of No. 996,169, and for examples of lateral admission see, Figures 1, 2, 3, 4, 5, 6, 9, 10 and 11 of No. 996,169.

The principal object of this invention is to make provision for varying cut-off at an inlet in engines of the type referred to where peripheral admission is used.

By this invention such engines may readily be made suitable for use under conditions where air as supplied may vary considerably in pressure, for instance for use in mines.

One example of means according to this invention for varying cut-off at an inlet with a drum of an engine comprises a movable valve member having a cylindrical surface portion to act as a part of the casing for the blades of the drum and a cut-off edge, and movable angularly about the axis of the drum.

In one arrangement according to this invention, there may be provided at the intermediate region movable panels extending from the inlet one for each drum, each having a cylindrical surface arranged to conform with its cylindrical barrier surface and each capable of angular movement concentrically about the axis of the drum with which it is associated, the adjacent ends of the panels forming the cut-off edges at the inlet.

The cut-off edges may conform angularly or substantially so with the parts of the blades by which they are swept. Thus, in application to an engine in which the blades are completely helical, for instance, see specification of United States Patent No. 1,026,887, the adjacent cut-off edges of the panels may be correspondingly helical. In application to an engine in which a part of the blades at the intermediate region is parallel with the axis of the drum, for instance, see specification of United States Patent No. 996,169, Figure 7, the adjacent cut-off edges of the panels may be straight and parallel with the axis of the drums. In both such cases the edges of the blades at the midway position would coincide with the cut-off edges of the panels as they pass.

Each panel is of segmental form and has a cylindrical working surface corresponding to the barrier surface of the casing with which it is associated.

The panels are mounted in guides formed in the casing, the guides extending circumferentially in opposite directions from the inlet. Circumferential movement of the panels may conveniently be produced by means which when operated impart movement to the panels and when not operated act to lock the panels.

Some examples according to this invention will now be described with reference to the accompanying drawings, in which:—

Figure 1 is a side sectional elevation of an engine the section taken being perpendicular to the axes of the drums.

Figure 2 is a diagram of the drums in plan.

Figure 3 is a plan showing a portion of the engine at the inlet, and Figure 4 is a sectional elevation thereof.

Figures 5 and 6 are views corresponding to Figures 3 and 4 illustrating a modification of the panels.

Figure 7 is an end elevation of a portion of Figure 1, and Figure 8 is a section of Figure 7.

Figure 9:
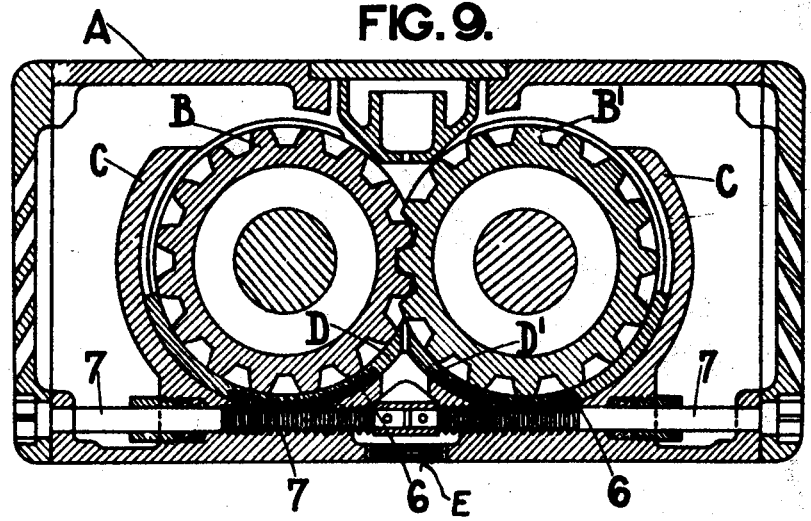
Figure 9 is a side sectional elevation of an engine showing means for moving the panels angularly simultaneously.

In the drawings A designates a housing, B B¹ drums, C a casing comprising barrier surfaces 2, 2¹ in peripheral conformity with the drums, E an inlet extending to the intermediate region where the blades of the drums present surfaces which peripherally are of cylindrical character. D and D¹ are panels extending from inlet E, D associated with drum B and D¹ with drum B¹, each panel having a cylindrical surface portion to act as a part of the casing C and having a cut-off edge 3 at the inlet E. The panels D and D¹ are movable angularly, D about the axis of drum B and D¹ about the axis of the drum B¹. The housing is formed with openings 4 for the escape of exhaust air.

The cut-off edges 3 at the adjacent ends of the panels as illustrated at Figures 3, 4 and 5, 6, are for drums having blades completely helical, the reverse helical blades of a drum meeting at an intermediate region that is shown being midway between the ends of a drum, see Figure 2, the cut-off edges 3, see Figures 3 and 5, being correspondingly helical.

Figure 10:
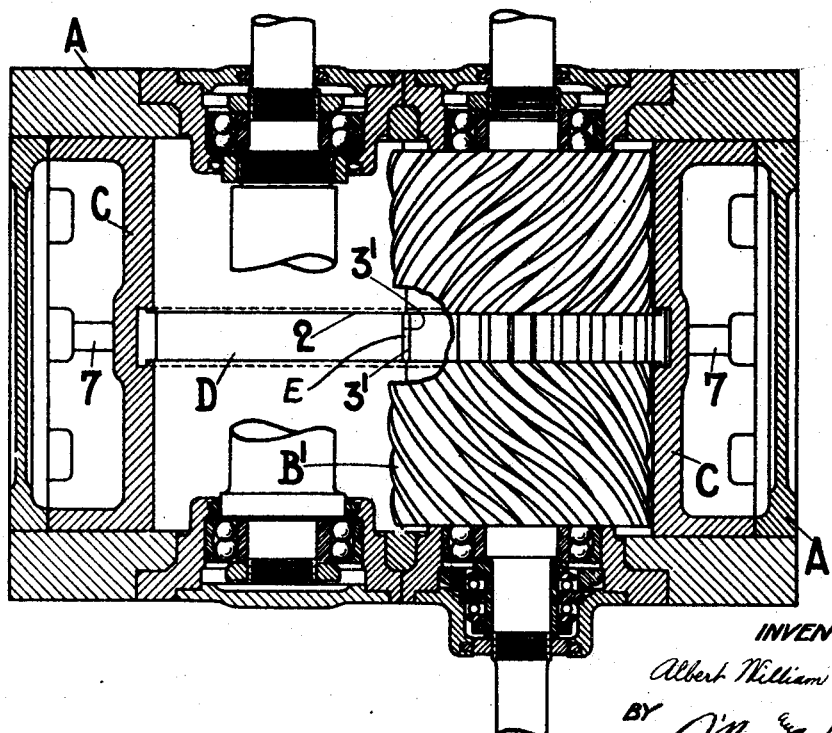
Figure 10 is a sectional plan with some parts omitted.

The panels are mounted in guides those shown being undercut. The panels shown in Figure 1 are independently movable and for retaining them in the angular position desired a set screw 5 is provided for use with a series of holes, those indicated enabling settings to be made of small extent. The panels shown in Figures 9 and 10 are movable by screw and rack mechanism. In this case each panel is formed with a screw rack 6 with which a screw on a rod 7 engages, the screw for one being of a reverse hand to that for the other panel. The rods 7 are connected at their adjacent ends to rotate together. Thus, by rotating the rods 7 from either end both panels are moved equally away from or towards one another.

The adjacent ends of the panels may be formed so that when in contact the inlet E remains open, as shown at Figures 1, 3, 4, or the inlet E is closed, as shown at Figures 5 and 6. Thus, panels as shown at Figures 5 and 6, or 9 and 10 if operated together, say, as shown at Figure 9, may be used to stop supply and so act as a stop valve for the engine.

The engine illustrated at Figures 9 and 10 comprises drums each of which has blades, extending from end to end, a part of which at the intermediate region is parallel with the axis of the drum. In this case the cut-off edges 3¹ of the panels D D¹ are straight and parallel with the axis of the drums.

I claim:—

1. A peripheral admission rotary engine comprising a casing, an inlet, corresponding drums, the casing having two barrier surfaces, one for each drum, each drum having blades extending from end to end and thus through an intermediate region, intermediate between the ends of a drum, the blades having helical portions directed reversely from the intermediate region, the drums being correspondingly arranged with their blades intermeshing, the inlet extending to the intermediate region where the blades of the drums present surfaces which peripherally are of cylindrical character, and having means for varying cut-off.

2. A peripheral admission rotary engine comprising a casing, an inlet, corresponding drums, the casing having two barrier surfaces, one for each drum, each drum having blades extending from end to end and thus through an intermediate region, intermediate between the ends of a drum, the blades being completely helical and directed reversely from the intermediate region, reversely directed portions of the helical blades meeting at the intermediate region, the drums being correspondingly arranged with their blades intermeshing, the inlet extending to the intermediate region where the blades of the drums present surfaces which peripherally are of cylindrical character, and having means for varying cut-off.

3. A peripheral admission rotary engine comprising a casing, an inlet, corresponding drums, the casing having two barrier surfaces, one for each drum, each drum having blades extending from end to end and thus through an intermediate region, intermediate between the ends of a drum, the blades having helical portions directed reversely from the intermediate region, the drums being correspondingly arranged with their blades intermeshing, the inlet extending to the intermediate region where the blades of the drums present surfaces which peripherally are of cylindrical character, two panels extending from the inlet, one for each drum, each panel having a cylindrical surface in conformity with the cylindrical barrier surface of the casing for that drum and a cut-off edge at the inlet, and movable angularly about the axis of the drum.

4. A peripheral admission rotary engine comprising a casing, an inlet, corresponding drums, the casing having two barrier surfaces, one for each drum, each drum having blades extending from end to end and thus through an intermediate region, intermediate between the ends of a drum, the blades being completely helical and directed reversely from the intermediate region, reversely directed portions of the helical blades meeting at the intermediate region, the drums being correspondingly arranged with their blades intermeshing, the inlet extending to the intermediate region where the blades of the drums present surfaces which peripherally are of cylindrical character, two panels extending from the inlet, one for each drum, each panel having a cylindrical surface in conformity with the cylindrical barrier surface of the casing for that drum and a cut-off edge at the inlet, and movable angularly about the axis of the drum.

5. A peripheral admission rotary engine comprising a casing, an inlet, corresponding drums, the casing having two barrier surfaces, one for each drum, each drum having blades extending from end to end and thus through an intermediate region, intermediate between the ends of a drum, the blades having helical portions directed reversely from the intermediate region, the drums being correspondingly arranged with their blades intermeshing, the inlet extending to the intermediate region where the blades of the drums present surfaces which peripherally are of cylindrical character, two panels extending from the inlet, one for each drum, each panel having a cylindrical surface in conformity with the cylindrical barrier surface of the casing for that drum and a cut-off edge, at the inlet and movable angularly about the axis of the drum, the cut-off edge conforming angularly with the parts of the blades by which it is swept.

6. A peripheral admission rotary engine comprising a casing, an inlet, corresponding drums, the casing having two barrier surfaces, one for each drum, each drum having blades extending from end to end and thus through an intermediate region, intermediate between the ends of a drum, the blades being completely helical and directed reversely from the intermediate region, reversely directed portions of the helical blades meeting at the intermediate region, the drums being correspondingly arranged with their blades intermeshing, the inlet extending to the intermediate region where the blades of the drums present surfaces which peripherally are of cylindrical character, two panels extending from the inlet, one for each drum, each panel having a cylindrical surface in conformity with the cylindrical barrier surface of the casing for that drum and a cut-off edge at the inlet, and movable angularly about the axis of the drum, the cut-off edge conforming helically with the blades by which it is swept.

7. A peripheral admission rotary engine comprising a casing, an inlet, corresponding drums, the casing having two barrier surfaces, one for each drum, each drum having blades extending from end to end and thus through an intermediate region, intermediate between the ends of a drum, the blades having helical portions directed reversely from the intermediate region, the drums being correspondingly arranged with their blades intermeshing, the inlet extending to the intermediate region where the blades of the drums present surfaces which peripherally are of cylindrical character, two panels extending from the inlet, one for each drum, each panel having a cylindrical surface in conformity with the cylindrical barrier surface of the casing for that drum and a cut-off edge at the inlet, and movable angularly about the axis of the drum, and means which when operated impart movement to the panel and when not operated act to lock the panel.

8. A peripheral admission rotary engine comprising a casing, an inlet, corresponding drums, the casing having two barrier surfaces, one for each drum, each drum having blades extending from end to end and thus through an intermediate region, intermediate between the ends of a drum, the blades having helical portions directed reversely from the intermediate region, the drums being correspondingly arranged with their blades intermeshing, the inlet extending to the intermediate region where the blades of the drums present surfaces which peripherally are of cylindrical character, two panels extending from the inlet, one for each drum, each panel having a cylindrical surface in conformity with the cylindrical barrier surface of the casing for that drum and a cut-off edge at the inlet, and movable angularly about the axis of the drum, and a system of screw and rack engagement for moving and locking each panel.

9. A peripheral admission rotary engine comprising a casing, an inlet, corresponding drums, the casing having two barrier surfaces, one for each drum, each drum having blades extending from end to end and thus through an intermediate region, intermediate between the ends of a drum, the blades having helical portions directed reversely from the intermediate region, the drums being correspondingly arranged with their blades intermeshing, the inlet extending to the intermediate region where the blades of the drums present surfaces which peripherally are of cylindrical character, two panels extending from the inlet, one for each drum, each panel having a cylindrical surface in conformity with the cylindrical barrier surface of the casing for that drum and a cut-off edge at the inlet, and movable angularly about the axis of the drum, and means which in operation produce similar adjustment for each panel.

10. A peripheral admission rotary engine comprising a casing, an inlet, corresponding drums, the casing having two barrier surfaces, one for each drum, each drum having blades extending from end to end and thus through an intermediate region, intermediate between the ends of a drum, the blades having helical portions directed reversely from the intermediate region, the drums being correspondingly arranged with their blades intermeshing, the inlet extending to the intermediate region where the blades of the drums present surfaces which peripherally are of cylindrical character, two panels extending from the inlet, one for each drum, each panel having a cylindrical surface in conformity with the cylindrical barrier surface of the casing for that drum and a cut-off edge at the inlet, and movable angularly about the axis of the drum, a screw rack formed at the back of each panel, and screws to engage with the racks arranged tangentially thereto, for the purposes set forth.

ALBERT WILLIAM DAVIES.